(12) United States Patent
Wilson et al.

(10) Patent No.: US 9,399,194 B2
(45) Date of Patent: Jul. 26, 2016

(54) METHODS FOR TREATING A LIQUID USING DRAW SOLUTIONS

(71) Applicant: BATTELLE ENERGY ALLIANCE, LLC, Idaho Falls, ID (US)

(72) Inventors: Aaron D. Wilson, Idaho Falls, ID (US); Christopher J. Orme, Firth, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 82 days.

(21) Appl. No.: 14/333,362

(22) Filed: Jul. 16, 2014

(65) Prior Publication Data

US 2016/0016115 A1   Jan. 21, 2016

(51) Int. Cl.
- *C02F 1/44* (2006.01)
- *B01D 11/00* (2006.01)
- *B01D 61/00* (2006.01)
- *B01D 61/24* (2006.01)

(52) U.S. Cl.
CPC ............ *B01D 61/005* (2013.01); *B01D 61/002* (2013.01); *C02F 1/445* (2013.01)

(58) Field of Classification Search
CPC .... B01D 61/002; B01D 61/005; B01D 61/58; C02F 1/44
See application file for complete search history.

(56) References Cited

U.S. PATENT DOCUMENTS

| | | | |
|---|---|---|---|
| 7,982,069 B2 | 7/2011 | Jessop et al. | |
| 8,071,624 B2 * | 12/2011 | Yao | C07D 11/60 514/330 |
| 8,283,385 B2 | 10/2012 | Jessop | |
| 8,445,714 B2 * | 5/2013 | Bhat | C07C 229/14 560/42 |

(Continued)

FOREIGN PATENT DOCUMENTS

| | | |
|---|---|---|
| WO | 2011097727 | 8/2011 |
| WO | 2012079175 | 6/2012 |

(Continued)

OTHER PUBLICATIONS

Durelle et al. "Modelling the Behaviour of Switchable Hydrophilicity Solvents", Electronic Supplementary Material for Physical Chemistry Chemical Physics, © The Owner Societies 2014, pp. 1-6.

(Continued)

*Primary Examiner* — Ana Fortuna
(74) *Attorney, Agent, or Firm* — TraskBritt

(57) ABSTRACT

Draw solutions comprising at least one N-cyclicalkyl-cycloalkylamine and a secondary solvent. The N-cyclicalkyl-cycloalkylamine comprises the chemical structure:

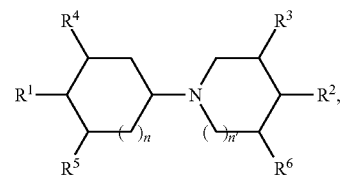

wherein n is 0, 1, or 2, n' is 0, 1, or 2, and each of $R^1$-$R^6$ is independently selected from the group consisting of an alkyl group, an alkoxy group, an acetyl group, an aryl group, a hydrogen group, a hydroxyl group, and a phosphorus-containing group. Methods of treating a liquid using the draw solution are also disclosed.

19 Claims, 6 Drawing Sheets

(56) References Cited

U.S. PATENT DOCUMENTS

| | | |
|---|---|---|
| 8,574,453 B2 | 11/2013 | Yu et al. |
| 8,580,124 B2 | 11/2013 | Jessop et al. |
| 8,652,237 B2 | 2/2014 | Heldebrant et al. |
| 8,742,116 B2 * | 6/2014 | Plettenburg .......... C07D 401/12 546/199 |
| 2012/0018365 A1 | 1/2012 | Iyer |
| 2012/0267308 A1 | 10/2012 | Carmignani et al. |
| 2013/0048561 A1 | 2/2013 | Wilson et al. |
| 2013/0048564 A1 | 2/2013 | Stewart et al. |
| 2013/0075333 A1 | 3/2013 | Pruet et al. |
| 2013/0105377 A1 | 5/2013 | Jessop et al. |
| 2013/0200291 A1 | 8/2013 | Jessop et al. |
| 2013/0313182 A1 * | 11/2013 | Kang ..................... B01D 71/80 210/321.72 |
| 2014/0076810 A1 | 3/2014 | Jessop et al. |
| 2014/0158621 A1 | 6/2014 | Lee et al. |
| 2015/0165380 A1 * | 6/2015 | Jung .................... B01D 61/005 210/648 |
| 2016/0016115 A1 * | 1/2016 | Wilson ................ B01D 61/005 210/648 |

FOREIGN PATENT DOCUMENTS

| | | |
|---|---|---|
| WO | 2013036111 | 3/2013 |
| WO | 2014078415 | 5/2014 |

OTHER PUBLICATIONS

Durelle et al. "Modelling the Behaviour of Switchable Hydrophilicity Solvents", Phys. Chem. Chem. Phys., Jan. 27, 2014, 6 pp.
Jessop et al. "Reversible Nonpolar-to-Polar Solvent", Nature Publishing Group, vol. 436, Aug. 25, 2005, 1 pg.
Jessop "Searching for Green Solvents", Green Chem., Feb. 7, 2011, 8 pp.
Jessop et al. "A Solvent Having Switchable Hydrophilicity", Green Chem., 12, Mar. 5, 2010, pp. 809-814.
Jessop et al. "Tertiary Amine Solvents Having Switchable Hydrophilicity", Green Chem. 13, Feb. 3, 2011, pp. 619-623.
Wilson et al. "Structure-Function Study of Tertiary Amines as Swtichable Polarity Solvents", RSC Adv., 2014, 4, pp. 11039-11049.
International Search Report for PCT Application No. PCT/US2015/039665, mailed Sep. 30, 2015, 3 pages.
International Written Opinion for PCT Application No. PCT/US2015/039665, mailed Sep. 30, 2015, 5 pages.

* cited by examiner

METHODS FOR TREATING A LIQUID USING DRAW SOLUTIONS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The present disclosure, in various embodiments, relates to methods and draw solutions for treating a liquid to purify, or to concentrate, at least one of a solvent and a solute therein. More specifically, embodiments of the present disclosure relate to methods and draw solutions for treating a liquid using an N-cyclicalkyl-cycloalkylamine as a switchable polarity solvent.

BACKGROUND

Decreasing water supplies throughout much of the industrialized world has necessitated new methods and systems for utilizing water including contaminants or impurities. Additionally, certain industries have a need for safer, more energy efficient methods and systems for removing water from a target material or solute. Traditional methods and systems of liquid treatment include thermal flash evaporation and membrane filtration. One membrane filtration method is reverse osmosis (RO), in which water is separated from solutes (e.g., contaminants) in a feed liquid by application of a pressure overcoming the osmotic pressure of the feed liquid. For water desalination processes, the pressure sufficient to overcome the osmotic pressure of the feed liquid can be substantial, such as greater than 50 atm, resulting in significant equipment and energy costs. Additionally, the application of pressure often exacerbates reverse osmosis membrane fouling by inorganic and organic molecules.

Forward osmosis (FO) circumvents several of the deficiencies of RO by using osmotic pressure gradients across a semi-permeable membrane to diffuse water from the feed liquid into a draw solution. The draw solution includes a draw solute that provides the draw solution with a greater osmotic pressure than the feed liquid. Draw solutes have included sulfur dioxide, aluminum sulfate, sugars (e.g., glucose, fructose, sucrose), potassium nitrate, ammonium carbonate, and ammonium carbamate. However, use of these draw solutes requires energy intensive processes, such as RO, in order to be removed from the water they draw, or produce materials (e.g., $SO_2$, gaseous ammonia) that are toxic, volatile, and correspondingly expensive to handle.

Switchable polarity solvents (SPSs) have also been proposed for use as draw solutes. When exposed to carbon dioxide ($CO_2$), the SPSs transition between a nonpolar form and a polar form, which have differing solubilities in water. Amines, such as amidines, guanidines, primary amines, and secondary amines, have been investigated as SPSs. However, some of these amines are water sensitive, which reduces their applicability for use in water-containing processes. Highly functionalized amidines and guanidines, as well as tertiary amines, have been found to exhibit an increased compatibility with water. Linear and cyclic tertiary amines including N,N-dimethylbutylamine, triethylamine, N,N-dimethylcyclohexylamine (DMCA), 1-butylpyrrolidine, 1-ethylpiperidine, N,N-dimethylaniline, 4-N,N-trimethylaniline, N,N-dimethyl-o-toluidine, and N,N-dicyclohexylmethylamine have been investigated as SPSs due to their simplicity and low cost. However, not all of these investigated tertiary amines functioned effectively as SPSs.

While DMCA functions as an SPS, DMCA is incompatible with many conventional membrane materials used in RO or FO processes. The DMCA has been found to decompose or otherwise degrade the membrane materials. Furthermore, the transition of DMCA from its polar form to its nonpolar form is incomplete and is insufficient for its complete removal from water, which reduces its effectiveness for feed liquids that contain water.

BRIEF SUMMARY

An embodiment of the disclosure includes a draw solution comprising at least one N-cyclicalkyl-cycloalkylamine and a secondary solvent. The N-cyclicalkyl-cycloalkylamine comprises the chemical structure:

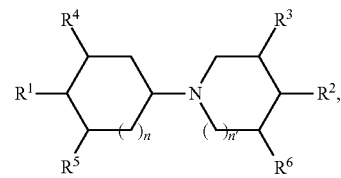

wherein n is 0, 1, or 2, n' is 0, 1, or 2, and each of $R^1$-$R^6$ is independently selected from the group consisting of an alkyl group, an alkoxy group, an acetyl group, an aryl group, a hydrogen group, a hydroxyl group, and a phosphorus-containing group.

Another embodiment of the disclosure includes a method of treating a liquid. The method comprises converting a draw solution comprising at least one N-cyclicalkyl-cycloalkylamine in a nonpolar form into a draw solution comprising the at least one N-cyclicalkyl-cycloalkylamine in a polar form. One side of a membrane is contacted with the draw solution comprising the at least one N-cyclicalkyl-cycloalkylamine in the polar form and an opposite side of the membrane is contacted with a feed liquid comprising at least one solvent and at least one solute. The at least one solvent of the feed liquid is osmosed across the membrane and into the draw solution to form a diluted draw solution and a concentrated feed liquid.

DETAILED DESCRIPTION

Figure 1A:
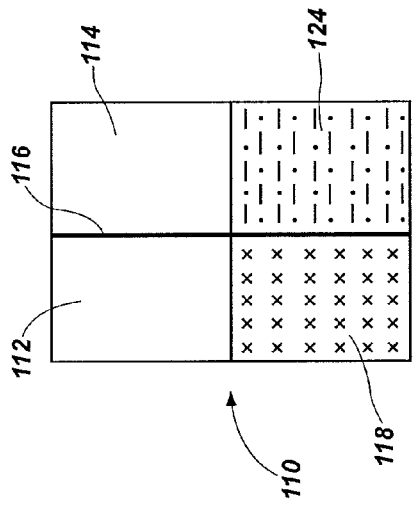
FIGS. 1A-1F are schematic drawings illustrating different process stages and solutions for a method of treating a liquid in accordance with an embodiment of the present disclosure.

N-cyclicalkyl-cycloalkylamines are disclosed for use as a draw solute in a draw solution. The N-cyclicalkyl-cycloalkylamine may transition between a polar form and a nonpolar form upon exposure to a switching agent. The draw solution may be used in an osmotically driven membrane process (ODMP), such as a forward osmosis (FO) process, a switchable polarity solvent (SPS)-FO process, a desalination process, treatment of industrial waters, or a pressure retarded osmosis process, to separate or remove a solvent from a feed liquid or to increase a concentration of at least one solute in the feed liquid.

The following description provides specific details, such as equipment types, material compositions, and processing conditions in order to provide a thorough description of embodiments of the present disclosure. However, a person of ordinary skill in the art will understand that the embodiments of the present disclosure may be practiced without employing these specific details. Indeed, the embodiments of the present disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, pumps, line filters, valves, temperature detectors, pressure detectors, and the like) are not described herein but that using various conventional process components and acts would be in accord with the present disclosure. The drawings accompanying the present application are for illustrative purposes only, and are not meant to be actual views of any particular material, device, or system.

As used herein, the term "cyclicalkyl" means and includes a cyclic hydrocarbon functional group having from five carbon atoms to seven carbon atoms. The cyclicalkyl may include, but is not limited to, a cyclopentyl group, a cyclohexyl group, or a cycloheptyl group. As described in more detail below, at least one carbon atom of the cyclicalkyl functional group may be substituted.

As used herein, the term "cycloalkylamine" means and includes a cyclic hydrocarbon functional group having from four carbon atoms to six carbon atoms and a nitrogen atom. The nitrogen atom may be a tertiary amine. The cycloalkylamine may include, but is not limited to, a pyrrolidine group, a piperidine group, or an azepane group. As described in more detail below, at least one carbon atom of the cycloalkylamine functional group may be substituted.

As used herein, the term "switchable polarity solvent" means and includes an N-cyclicalkyl-cycloalkylamine that is formulated to switch or convert between the polar form (SPS-$H^+$) and the nonpolar form (SPS) when exposed to the switching agent. The term "SPS" is used herein to refer collectively to the N-cyclicalkyl-cycloalkylamine in its nonpolar and polar forms, as well as to refer to the N-cyclicalkyl-cycloalkylamine in the nonpolar form, as the context will make clear. Each of the polar form and the nonpolar form of the N-cyclicalkyl-cycloalkylamine may have a different solubility in a secondary solvent of the draw solution or in a solvent of the feed liquid. For example, the polar form (SPS-$H^+$) of the N-cyclicalkyl-cycloalkylamine may be miscible in the solvent of the feed liquid or in the secondary solvent of the draw solution, while the nonpolar form (SPS) of the N-cyclicalkyl-cycloalkylamine may be immiscible in the solvent of the feed liquid or in the secondary solvent of the draw solution.

The N-cyclicalkyl-cycloalkylamine has the following chemical structure:

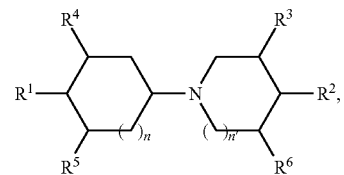

where n is 0, 1, or 2, n' is 0, 1, or 2, and each of $R^1$-$R^6$ is independently selected from an alkyl group, an alkoxy group, an acetyl group, an aryl group, a hydrogen group, a hydroxyl group, or a phosphorus-containing group. The above chemical structure represents the N-cyclicalkyl-cycloalkylamine in its nonpolar form. Each of $R^1$-$R^6$ may be selected as appropriate to provide a balance between the molecular weight and water solubility of the N-cyclicalkyl-cycloalkylamine because as the molecular weight increases, the water solubility decreases.

The term "alkyl" means and includes a saturated, unsaturated, straight, branched, or cyclic hydrocarbon containing from one carbon atom to ten carbon atoms. Examples include, but are not limited to, methyl, ethyl, propyl (n-propyl, isopropyl, cyclopropyl), butyl (n-butyl, isobutyl, sec-butyl, tert-butyl, cyclobutyl), pentyl (n-pentyl, tert-pentyl, neopentyl, isopentyl, sec-pentyl, 3-pentyl, cyclopentyl), hexyl (isohexyl, cyclohexyl, 3-methylpentyl, 2,2-dimethylbutyl, 2,3-dimethylbutyl), heptyl, octyl, nonyl, or decyl.

The term "alkoxy" means and includes an alkyl group linked to an oxygen atom. The alkoxy group may include, but is not limited to, a methoxy group, an ethoxy group, a propoxy group, a butoxy group, a pentoxy group, a hexoxy group, a heptoxy group, an octoxy group, a nonoxy group, or a decoxy group, or an alkoxy-substituted alkoxy group (i.e., a polyether group), such as a methoxy methoxy group, a methoxy ethoxy group, an ethoxy methoxy group, an ethoxy ethoxy group, a methoxy ethoxy ethoxy group, etc. The alkoxy group may also include a glycol group, such as ethylene glycol or propylene glycol.

The term "acetyl" means and includes a group having the chemical formula of $CH_3(C=O)$.

The term "aryl" means and includes a hydrocarbon with alternating single and double bonds between carbon atoms forming a ring. Examples include, but are not limited to, a phenyl group, a tolyl group, or a naphthyl group. The aryl group may also contain a heteroatom, such as sulfur (thiophene, benzothiophene, etc.), oxygen (furan, benzofuran, etc.), or nitrogen (pyrrole, indole, pyridine, pyrimidine, imidazole, pyrazole, etc.)

The phosphorus-containing group may be a phosphono group ($-P(=O)(OH)_2$) or a phosphate group ($-OP(=O)(OH)_2$ or $-OPO(OR_2)$) where R is an alkyl group, an alkoxy group, an acetyl group, an aryl group, a hydrogen group, or a hydroxyl group as defined above.

Thus, the cyclicalkyl portion of the N-cyclicalkyl-cycloalkylamine may include a substituted or unsubstituted cyclopentyl group, a substituted or unsubstituted cyclohexyl group, or a substituted or unsubstituted cycloheptyl group. The cycloalkylamine portion of the N-cyclicalkyl-cycloalkylamine may include a substituted or unsubstituted pyrrolidine group, a substituted or unsubstituted piperidine group, or a substituted or unsubstituted azepane group.

By way of example only, if each of n and n' is 1, each of $R^1$ and $R^2$ may be independently selected from an alkyl group, an alkoxy group, an acetyl group, an aryl group, a hydroxyl group, or a phosphorus-containing group, while each of $R^3$-$R^6$ is a hydrogen.

By way of example only, if each of n and n' is 2, each of $R^1$ and $R^2$ may be independently selected from an alkyl group, an alkoxy group, an acetyl group, an aryl group, a hydroxyl group, or a phosphorus-containing group, while each of $R^3$-$R^6$ is a hydrogen.

The N-cyclicalkyl-cycloalkylamine may, optionally, include a heteroatom in the cyclicalkyl portion of the N-cyclicalkyl-cycloalkylamine. By way of example only, the carbon atom to which $R^1$ is bonded may be replaced with a nitrogen atom or an oxygen atom. The N-cyclicalkyl-cycloalkylamine may, optionally, include an additional heteroatom in the cycloalkylamine portion of the N-cyclicalkyl-cycloalkylamine. By way of example only, the carbon atom to which $R^2$ is bonded may be replaced with a nitrogen atom.

In one embodiment, the N-cyclicalkyl-cycloalkylamine is 1-cyclohexylpiperidine (CHP), where n is 1, n' is 1, and each of $R^1$-$R^6$ is hydrogen. The chemical structure of the nonpolar form of CHP is shown below:

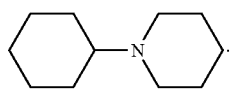 [SMILES: C1CCC(N2CCCCC2)CC1]

CHP has a boiling point of from about 230° C. to about 234° C., a flash point of about 101.4° C., and a vapor pressure of about 0.1 mm Hg at 25° C. In comparison, DMCA has a boiling point of from about 158° C. to about 159° C., a flash point of about 42.2° C., and a vapor pressure of about 2.2 mm Hg at 25° C. However, other N-cyclicalkyl-cycloalkylamine compounds within the scope of the chemical structure above may be contemplated.

The N-cyclicalkyl-cycloalkylamine may be commercially available from numerous sources including, but not limited to, Alfa Aesar, or may be synthesized by conventional techniques, which are not described in detail herein.

The draw solution may include at least one N-cyclicalkyl-cycloalkylamine and the secondary solvent. When the N-cyclicalkyl-cycloalkylamine is in its nonpolar form, the N-cyclicalkyl-cycloalkylamine may be insoluble in the secondary solvent of the draw solution. Thus, the draw solution may be a two-phase draw solution when the N-cyclicalkyl-cycloalkylamine is in its nonpolar form. Conversely, when the N-cyclicalkyl-cycloalkylamine is in its polar form, the N-cyclicalkyl-cycloalkylamine may be soluble in the secondary solvent of the draw solution. Thus, the draw solution may be a single-phase draw solution when the N-cyclicalkyl-cycloalkylamine is in its polar form. Since the secondary solvent of the draw solution may be the same as the solvent of the feed liquid, the N-cyclicalkyl-cycloalkylamine in its nonpolar form may be insoluble in the solvent of the feed liquid while the N-cyclicalkyl-cycloalkylamine in its polar form may be soluble in the solvent of the feed liquid.

In its initial state (i.e., before exposure to the switching agent), the draw solution may include the N-cyclicalkyl-cycloalkylamine in its nonpolar form at a concentration of less than about 2.0 g/kg, such as less than about 0.5 g/kg, while the secondary solvent accounts for the balance of the draw solution.

In addition to the N-cyclicalkyl-cycloalkylamine in its nonpolar form being insoluble in the secondary solvent, the secondary solvent may not react with, break down, substantially absorb, or otherwise negatively interact with the N-cyclicalkyl-cycloalkylamine. The secondary solvent may include, but is not limited to, water, an alcohol (e.g., methanol, ethanol, propanol, butanol, hexanol, octanol, or combinations thereof), or combinations thereof. The secondary solvent may the same as, or similar to, the solvent of the feed liquid.

The switching agent may react with the N-cyclicalkyl-cycloalkylamine upon contact. However, the switching agent may be a gas that is substantially non-reactive with other components of the feed liquid and the draw solution, such as with the solvent and solute of the feed liquid and the secondary solvent of the draw solution. The switching agent may include, but is not limited to, carbon dioxide ($CO_2$), carbon sulfide ($CS_2$), or carbonyl sulfide (COS). In one embodiment, the switching agent is $CO_2$. By way of example only, the transition of the N-cyclicalkyl-cycloalkylamine between its polar and nonpolar forms proceeds according to the following reaction when exposed to $CO_2$ as the switching agent:

As indicated above, the transition between the polar and nonpolar forms is reversible, such as by removing the switching agent from contact with the N-cyclicalkyl-cycloalkylamine.

When exposed to the switching agent, the N-cyclicalkyl-cycloalkylamine may convert from its nonpolar form to its polar form. The chemical structure of the polar form of the N-cyclicalkyl-cycloalkylamine, which is an aminium salt of the N-cyclicalkyl-cycloalkylamine, is shown below:

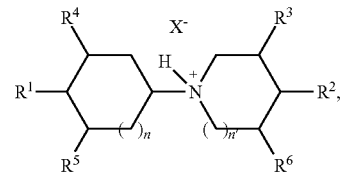

where each of n, n', and $R^1$-$R^6$ is as described above and X is an anionic counterion and depends on the switching agent used. The polar form of the N-cyclicalkyl-cycloalkylamine has an overall neutral charge.

The draw solution including the N-cyclicalkyl-cycloalkylamine as the SPS may have a greater osmotic pressure than the feed liquid, facilitating an osmotic pressure gradient through a membrane to draw the solvent from the feed liquid into the draw solution while leaving at least one solute in the feed liquid. The influx of solvent causes the draw solution to become diluted relative to its initial state, while the feed liquid becomes concentrated relative to its initial state. The solute in the feed liquid may be a contaminant (e.g., impurity) or may be a desired product in the feed liquid. After receiving the solvent in the draw solution, contact with the switching agent may enable a majority of the SPS to be separated from the solvent of the feed liquid and recovered. The recovered SPS may be recycled for use in additional processes. Trace amounts of SPS remaining in the solvent of the feed liquid may be efficiently separated by conventional processes, such as reverse osmosis. The SPS separated from the solvent of the feed liquid may be subjected to another change in reaction conditions, such as by removing (i.e., degassing) the switching agent, and may be used to repeat the process. The switching agent may be removed from contact with the N-cyclicalkyl-cycloalkylamine by stopping the flow of switching agent or by replacing the flow of switching agent with an inert gas such as argon, nitrogen ($N_2$), or air. In one embodiment, the SPS may be used to efficiently separate the solvent (e.g., water) from at least one solute (e.g., an inorganic material, an organic material, or an inorganic/organic hybrid material) in the feed liquid. In another embodiment, the SPS may be used to efficiently separate the solvent (e.g., water) from a mixture of at least one inorganic solute material and at least one organic solute material. The methods and systems of liquid treatment disclosed herein may be more energy efficient, less costly, and safer as compared to conventional liquid treatment systems for the purification or concentration of at least one of a solvent and a solute.

The draw solution may have a concentration of the polar form of the N-cyclicalkyl-cycloalkylamine that is greater than a total solute (i.e., combined organic and inorganic solutes) concentration of the feed liquid. The concentration difference between the feed liquid and the draw solution creates an osmotic pressure differential across the membrane to draw the solvent of the feed liquid toward the draw solution by forward osmosis. The draw solution may have a concentration of the polar form of the N-cyclicalkyl-cycloalkylamine within a range of from a lowest effective concentration of the polar form of the N-cyclicalkyl-cycloalkylamine (i.e., to facilitate a draw on the solvent of the feed liquid) to a solubility limit of the polar form of the N-cyclicalkyl-cycloalkylamine for the draw solution. By way of non-limiting example, the concentration of the polar form of the N-cyclicalkyl-cycloalkylamine for the draw solution may be within a range of from about 0.5 mol/kg to about 11.5 mol/kg, such as from about 1.0 mol/kg to about 7.0 mol/kg. In at least some embodiments, the draw solution has a concentration of the polar form of the N-cyclicalkyl-cycloalkylamine of about 11.2 mol/kg. The concentration of the polar form of the N-cyclicalkyl-cycloalkylamine may be controlled as desired at least by adjusting an amount of at least one of the nonpolar form of the N-cyclicalkyl-cycloalkylamine and the secondary solvent (e.g., water, alcohol) of the draw solution.

The N-cyclicalkyl-cycloalkylamine in the draw solution may be used to treat (e.g., purify or concentrate) the feed liquid that contains the solute. As shown in FIG. 1A, a feed liquid 118 may be provided to a first chamber 112 of a forward osmosis device 110. The forward osmosis device 110 may be a conventional device and, therefore, is not described in detail herein. The feed liquid 118 may be a solution that contains the solvent (e.g., water, organic solvents such as alcohols, or combinations thereof) and the solute. The solute may be a homogeneous material, a heterogeneous material, or combinations thereof. Non-limiting examples of homogeneous materials include inorganic materials (e.g., water soluble minerals, water soluble compounds such as salts), organic materials (e.g., pharmaceuticals, plasticizers, solvents, industrial chemicals, organics found in produced water), and inorganic/organic hybrid materials (e.g., coordination complexes, organometallic complexes such as dimethyl mercury). Non-limiting examples of heterogeneous materials include algae, microbes, small particulate matter, undissolved sewage material, nanoparticles, polymers, and food product solution materials, such as fruit juices and milk solutions. In one embodiment, the feed liquid 118 is a water stream that includes the at least one solute. As used herein, the term "solution" means and includes a solution of the solute in the solvent, a suspension of the solute in the solvent, an emulsion of the solute in the solvent, or combinations thereof.

Since a person of ordinary skill in the art will recognize whether a particular reference describes a solution, a suspension, an emulsion or a combination thereof from the context, for the purposes of readability and claiming the invention, the term "solution" means a solution, a suspension, an emulsion, or a combination thereof. The solute may, undesirably, be present in the feed liquid 118 as a contaminant or impurity of the solvent (e.g., where it is desired to purify or concentrate the at least one solvent of the feed liquid 118). Alternatively, the solvent may be present in the feed solution 118 as a contaminant or impurity of the solute (e.g., where it is desired to purify or concentrate the solute of the feed liquid 118). The feed liquid 118 may be a liquid stream in which a dilute solution of the solute is available, but a concentrated solution of the solute is commercially desired. By way of non-limiting example, the feed liquid 118 may include an aqueous saline solution, ocean water, brine, brackish water, mineralized water, industrial waste water, produced water, mining waste (e.g., a potash solution, a lithium salt solution), a food product solution (e.g., a fruit juice solution, milk solution), an acid solution, a base solution, a synthetic fermentation broth, algal growth media, a microbial solution, landfill leachate, a radioactive material solution, a toxic material solution, or combinations thereof In at least some embodiments, the feed liquid 118 includes ocean water from which the salt is desired to removed or decreased.

A nonpolar form 120 of the N-cyclicalkyl-cycloalkylamine and a secondary solvent 122 may be provided to a second chamber 114 of the forward osmosis device 110 to form a draw solution 123. Since the nonpolar form 120 of the N-cyclicalkyl-cycloalkylamine and the secondary solvent 122 are not miscible with one another, the draw solution 123 may be a multiple-phase (e.g., two-phase) draw solution. The second chamber 114 may be separated from the first chamber 112 by a membrane 116. The feed liquid 118 may be in contact with a first side of the membrane 116 and the draw solution 123 may be in contact with a second side of the membrane 116. The secondary solvent 122 may, optionally, include materials to assist with converting the N-cyclicalkyl-cycloalkylamine from the nonpolar form 120 to a polar form. Optionally, the secondary solvent 122 may be substantially similar to the solvent of the feed liquid 118 (e.g., if the solvent of the feed liquid is water, the secondary solvent 122 may be water). In at least some embodiments, the secondary solvent 122 includes water.

Figure 1B:
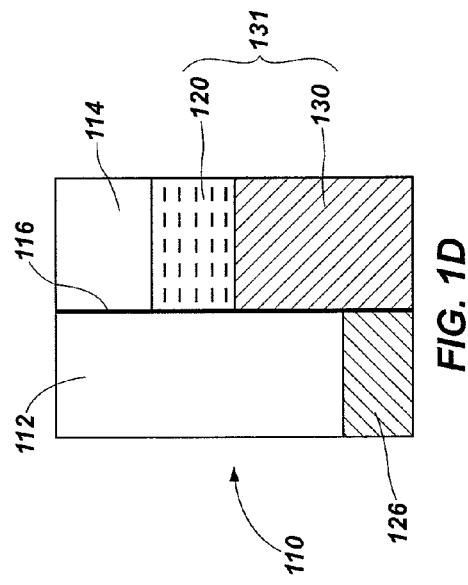

The draw solution 123 may be subjected to the switching agent to switch or convert the nonpolar form 120 of the N-cyclicalkyl-cycloalkylamine to a polar form of the N-cyclicalkyl-cycloalkylamine and form a draw solution 124, as shown in FIG. 1B, that includes the secondary solvent 122 (not shown) and an aminium salt of the N-cyclicalkyl-cycloalkylamine. As used herein, the term "aminium salt" means and includes an aminium cation and an anionic counterion where the N-cyclicalkyl-cycloalkylamine has an overall neutral charge. The draw solution including the polar form of the N-cyclicalkyl-cycloalkylamine may be a single-phase solution. In one embodiment, the draw solution 123 is exposed to $CO_2$ to change the N-cyclicalkyl-cycloalkylamine from the nonpolar form 120 to the polar form. The switching agent may be flowed through the draw solution 123, such as by flowing the switching agent through an aerator in the draw solution 123. By way of non-limiting example, where the draw solution 123 includes the N-cyclicalkyl-cycloalkylamine and water, adding or introducing $CO_2$ to the draw solution 123 may convert the nonpolar form 120 of the N-cyclicalkyl-cycloalkylamine into a bicarbonate (e.g., the polar form) of the N-cyclicalkyl-cycloalkylamine according to the following reversible reaction:

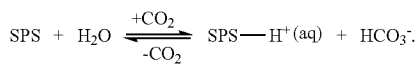

The bicarbonate of the N-cyclicalkyl-cycloalkylamine may have the following chemical structure:

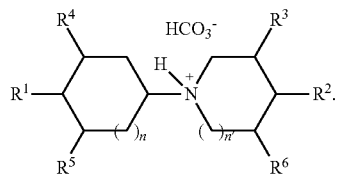

The bicarbonate (i.e., polar form) of the N-cyclicalkyl-cycloalkylamine may be miscible in water. By way of example only, the bicarbonate of CHP has the following chemical structure:

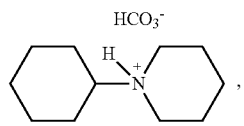

which is referred to herein as CHP-H$^+$.

While FIGS. 1A and 1B illustrate the conversion of the draw solution 123 into the draw solution 124 within the second chamber 114 of the forward osmosis device 110, each of the draw solution 123 and the draw solution 124 may be formed outside the forward osmosis device 110 and subsequently directed into the second chamber 114. For example, the draw solution 123 including the nonpolar faun 120 of the N-cyclicalkyl-cycloalkylamine 120 and the secondary solvent 122 may be formed in at least one separate vessel (not shown), such as in a gas contactor, the draw solution 123 may be exposed to the switching agent to form the draw solution 124 in the at least one separate vessel, and the draw solution 124 may be directed from the at least one separate vessel into the second chamber 114 of the forward osmosis device 110.

The draw solution 124 may include a concentration of the polar form of the N-cyclicalkyl-cycloalkylamine that is greater than a total solute concentration of the feed liquid 118. In an FO process, the osmotic strength of the N-cyclicalkyl-cycloalkylamine is the thermodynamic driving force for the solvent (e.g., water) transport process. The difference in concentration between the draw solution 124 and the feed liquid 118 creates an osmotic pressure differential across the membrane 116 to draw the solvent of the feed liquid 118 toward the draw solution 124 by forward osmosis. The draw solution 124 may include a concentration of the polar form of the N-cyclicalkyl-cycloalkylamine within a range of from a lowest effective concentration of the polar form of the N-cyclicalkyl-cycloalkylamine (i.e., to facilitate a draw on the solvent of the feed liquid 118) to a solubility limit of the polar form of the N-cyclicalkyl-cycloalkylamine for the draw solution 124.

While FIG. 1B shows the feed liquid 118 and the draw solution 124 pre-osmotic flux transfer (pre-equilibration), at least one of the draw solution 124 and the feed liquid 118 may be flowed or passed through the forward osmosis device 110 due to the osmotic pressure differential. For example, the feed liquid 118 may be flowed or passed through the first chamber 112 of the forward osmosis device 110, and the draw solution 124 may be flowed or passed through the second chamber 114 of the forward osmosis device 110. The feed liquid 118 and the draw solution 124 may be flowed or passed through the forward osmosis device 110 in the same direction (i.e., concurrent flow) or in opposite directions (i.e., countercurrent flow). In at least one embodiment, the feed liquid 118 and the draw solution 124 are flowed through the forward osmosis device 110 in opposite directions.

Figure 1C:
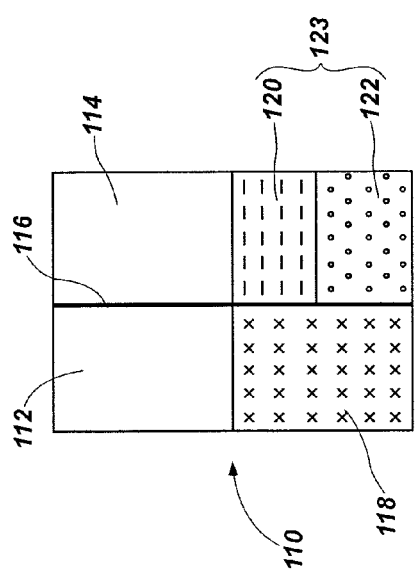

As shown in FIG. 1C, as the solvent of the feed liquid 118 is drawn toward the draw solution 124, at least a portion of the solvent may osmose or diffuse through the membrane 116 to form a concentrated feed liquid 126 in the first chamber 112 and a diluted draw solution 128 in the second chamber 114, where the diluted draw solution 128 includes the osmosed portion of the solvent. The membrane 116 may be any conventional membrane configured to facilitate the diffusion of the solvent from the first chamber 112 into the second chamber 114, while substantially preventing the diffusion or passage of the solute from the first chamber 112 into the second chamber 114. The membrane 116 may also substantially prevent the diffusion or passage of the polar and nonpolar forms of the N-cyclicalkyl-cycloalkylamine from the second chamber 114 into the first chamber 112. Suitable membranes 116, such as semi-permeable membranes, are commercially available from numerous sources including, but not limited to, Hydration Technology Innovations (Scottsdale, Ariz.), Porifera, Inc. (Hayward, Calif.), and Oasys Water, Inc. (Boston, Mass.). The concentrated feed liquid 126 may be disposed of or utilized as desired. The diluted draw solution 128 may be further processed, as described below.

Figure 1D:
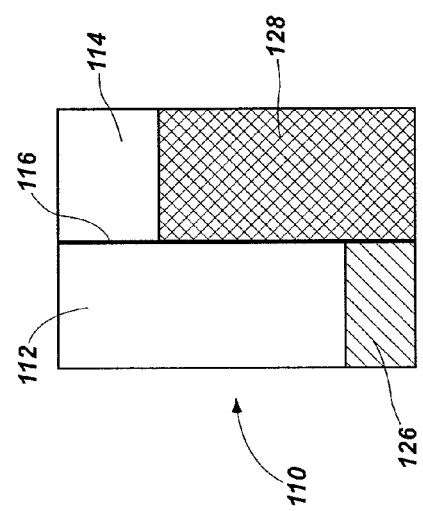

The diluted draw solution 128 may be subjected to a change of reaction conditions to release the switching agent from the diluted draw solution 128, thus converting the polar form of the N-cyclicalkyl-cycloalkylamine back into the nonpolar foam 120 and producing a multiple-phase solution 131 including the nonpolar form 120 of the N-cyclicalkyl-cycloalkylamine and a liquid product 130, as shown in FIG. 1D. By way of non-limiting example, the switching agent may be removed (i.e., degassed) from the diluted draw solution 128, enabling the polar form of the N-cyclicalkyl-cycloalkylamine to convert to the nonpolar form 120. The liquid product 130 may include a mixture of the solvent, the secondary solvent 122, and a trace amount of at least one of the nonpolar form 120 and the polar form of the N-cyclicalkyl-cycloalkylamine.

While FIG. 1D illustrates converting the polar form of the N-cyclicalkyl-cycloalkylamine back into the nonpolar form 120 and producing a multiple-phase solution 131 including the nonpolar form 120 of the N-cyclicalkyl-cycloalkylamine and a liquid product 130 within the second chamber 114 of the forward osmosis device 110, these acts may be formed outside the forward osmosis device 110 and subsequently directed into the second chamber 114. For example, the polar form of the N-cyclicalkyl-cycloalkylamine may be converted into the nonpolar form 120 and the multiple-phase solution 131 including the nonpolar form 120 of the N-cyclicalkyl-cycloalkylamine and the liquid product 130 may be formed in at least one separate vessel (not shown), such as in a gas contactor, and directed from the at least one separate vessel into the second chamber 114 of the forward osmosis device 110.

Following the formation of the multiple-phase solution 131, the nonpolar form 120 of the N-cyclicalkyl-cycloalkylamine and the liquid product 130 may be separated, such as by mechanical separation. Any conventional techniques of mechanical separation capable of substantially separating the nonpolar form 120 of the N-cyclicalkyl-cycloalkylamine and the liquid product 130 may be used, such as one or more of decanting, filtering, and centrifuging. Upon separation, the nonpolar form 120 of the N-cyclicalkyl-cycloalkylamine may be directed or recycled to the second chamber 114 of the forward osmosis device 110 (or to a separate vessel) for use in repeating the process described above. The liquid product 130 may be further processed, as described below. However, if the feed liquid 118 is being treated to purify or concentrate the at least one solute (e.g., to form the concentrated feed liquid 126), further processing of the liquid product 130 may, optionally, be omitted.

Figure 1F:
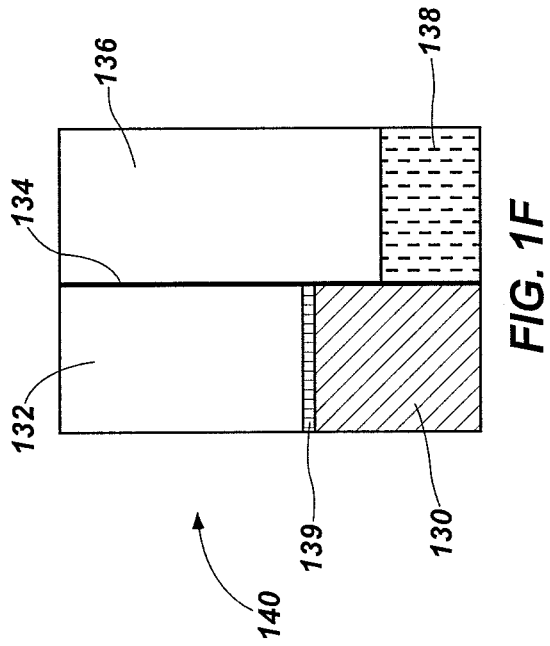
Figure 1E:
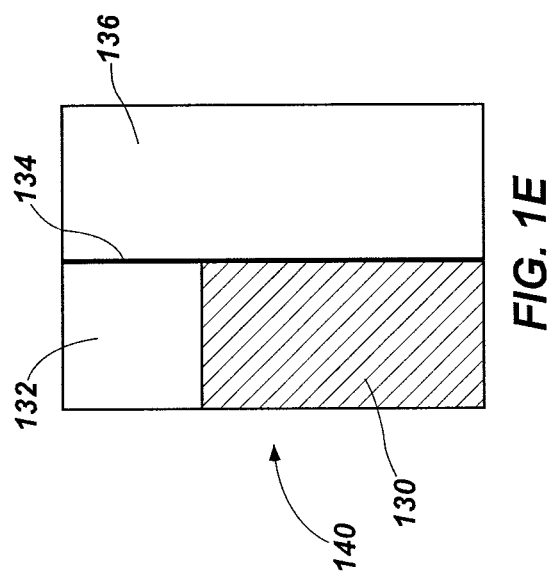

As shown in FIG. 1E, the liquid product 130 may be directed into a first chamber 132 of a filtration device 140. The first chamber 132 may be separated from a second chamber 136 by a semi-permeable membrane 134. The second chamber 136 may be substantially empty. The semi-permeable membrane 134 may be any conventional membrane configured to facilitate a pressure assisted diffusion of the solvent and the secondary solvent 122 of the liquid product 130 from the first chamber 132 into the second chamber 136 of the filtration device 140, while substantially preventing diffusion or passage of nonpolar and polar forms of the N-cyclicalkyl-cycloalkylamine from the first chamber 132 into the second chamber 136 of the filtration device 140. By way of non-limiting example, the semi-permeable membrane 134 may include at least one RO membrane commercially available from numerous sources, such as from General Electric Water & Process Technologies (Trevose, Pa.).

Pressure may be applied to the liquid product 130 within the first chamber 132 of the filtration device 140 to force at least a portion of each of the solvent and the secondary solvent 122 of the liquid product 130 through the semi-permeable membrane 134 and into the second chamber 136 to form a purified liquid product 138. A separated N-cyclicalkyl-cycloalkylamine 139 including at least one of the polar form and the nonpolar form 120 of the N-cyclicalkyl-cycloalkylamine may be temporarily retained within the first chamber 132 of the filtration device 140. The purified liquid product 138 may be utilized as desired. The separated N-cyclicalkyl-cycloalkylamine 139 may be directed or recycled into the second chamber 114 of the forward osmosis device 110 (or a separate vessel) for use in repeating the process described above.

While FIGS. 1E and 1F illustrate producing the purified liquid product 138 through pressure-assisted filtration, the purified liquid product 138 may be produced through any conventional methods or techniques capable of removing trace amounts of the nonpolar and polar forms of the N-cyclicalkyl-cycloalkylamine from the liquid product 130. By way of non-limiting example, the purified liquid product 138 may be produced by subjecting the liquid product 130 to at least one of adsorption, distillation, electrodialysis, and evaporation.

Figure 2:
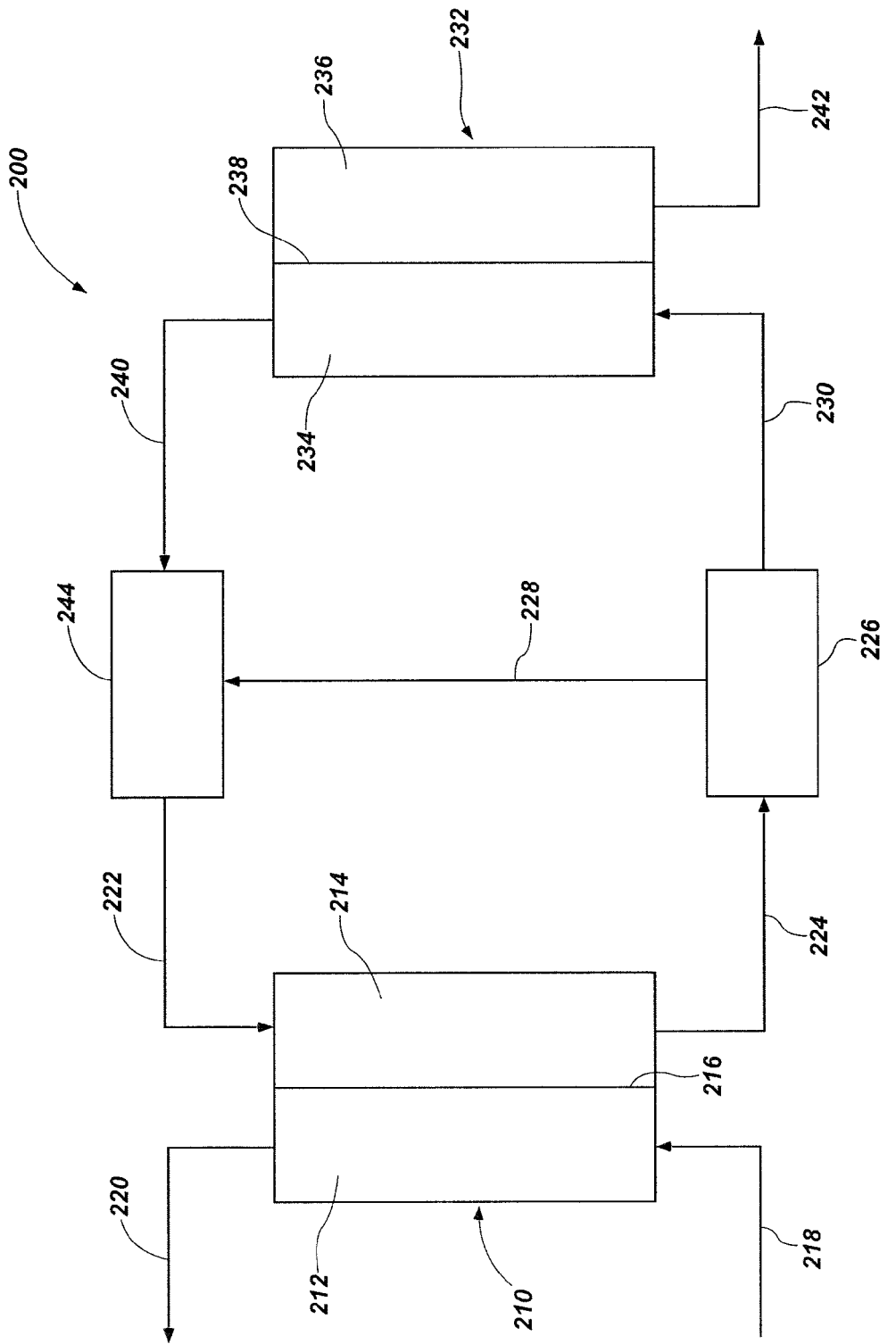
FIG. 2 is a schematic drawing of a liquid treatment system used to treat a liquid in accordance with an embodiment of the present disclosure.

A liquid treatment system 200 configured for performing an ODMP process is shown in FIG. 2. The liquid treatment system 200 may include a forward osmosis device 210, a first solvent switching area 226, a filtration device 232, and a second solvent switching area 244. The forward osmosis device 210 receives a feed liquid stream 218 in a first chamber 212 and a draw solution stream 222 in a second chamber 214. Within the forward osmosis device 210, an osmotic pressure gradient extending through a membrane 216 facilitates diffusion or transfer of solvent from the feed liquid stream 218 into the draw solution stream 222 to form each of a concentrated feed liquid stream 220 and a diluted draw solution stream 224. The concentrated feed liquid stream 220 may exit the first chamber 212 of the forward osmosis device 210 and may be utilized or disposed of as desired. The diluted draw solution stream 224 may be directed out of the second chamber 214 of the forward osmosis device 210 and into the first solvent switching area 226.

The first solvent switching area 226 facilitates the conversion of the diluted draw solution stream 224 into a first concentrated draw solution stream 228 and a liquid product stream 230. The first solvent switching area 226 may include at least one conventional device or conventional apparatus configured to expose the diluted draw solution stream 224 to a switching agent to form a multiple-phase liquid solution. By way of non-limiting example, the first solvent switching area 226 may include a tank (not shown) equipped with a gas contactor (not shown). The first solvent switching area 226 may also include a conventional separation device (e.g., a decanter, a filter, a centrifuge) configured to separate liquid phases of the multiple-phase liquid solution to form the first concentrated draw solution stream 228 and the liquid product stream 230. The first concentrated draw solution stream 228 and the liquid product stream 230 may each be directed out of the first solvent switching area 226 for further processing as described below.

Upon exiting the first solvent switching area 226, the liquid product stream 230 may be directed into a first chamber 234 of the filtration device 232. Within the filtration device 232, pressure may be applied to the liquid product stream 230 to drive a desired solvent therein through a semi-permeable membrane 238 and into a second chamber 236 to form each of a second concentrated draw solution stream 240 and a purified liquid product stream 242. In at least some embodiments, the semi-permeable membrane 238 is a reverse osmosis membrane. The purified liquid product stream 242 may exit the second chamber 236 of the filtration device 232 and may be utilized as desired. The second concentrated draw solution stream 240 may be directed out of the first chamber 234 of the filtration device 232 and into the second solvent switching area 244.

The second solvent switching area 244 may receive each of the first concentrated draw solution stream 228 and the second concentrated draw solution stream 240 and may produce the draw solution stream 222. The second solvent switching area 244 may include at least one conventional device or conventional apparatus configured and operated to expose the first concentrated draw solution stream 228 and the second concentrated draw solution stream 240 (e.g., together or separately) to the switching agent, and at least one of water and alcohol. By way of non-limiting example, the second solvent switching area 244 may include a mixer (not shown) in communication with a tank (not shown) including at least one gas contactor (not shown). Optionally, the second solvent switching area 244 may also include a conventional separation device (e.g., a filter, a centrifuge) configured and operated to separate an organic concentrate phase and a draw solution phase of a multi-phase solution. The draw solution stream 222 may be directed out of the second solvent switching area 244 and into the second chamber 214 of the forward osmosis device 210 to facilitate another pass through the liquid purification system 200.

The methods and draw solutions of the present disclosure advantageously reduce energy demands as compared to conventional liquid treatment methods and draw solutions for the purification or concentration of at least one of a solvent and a solute, including conventional methods and systems utilizing a combination of FO and RO. For example, during RO, conventional methods and draw solutions require application of significant pressure to overcome the osmotic pressure of the draw solute and separate the solvent therefrom. Conversely, the methods and draw solutions of the present disclosure enable a majority of the N-cyclicalkyl-cycloalkylamine (i.e., used as a draw solute) to be easily removed without using RO by a simple change of reaction conditions (e.g., exposure to $CO_2$) followed by separation. When needed, RO osmosis may be used to separate trace amounts of the N-cyclicalkyl-cycloalkylamine from the solvent, facilitating the use of lower pressures relative to conventional technologies.

The methods and draw solutions of the present disclosure may also be improved compared to methods and draw solutions using other tertiary amines, such as DMCA, as the SPS. The N-cyclicalkyl-cycloalkylamine may function as an SPS that exhibits an effective polar-to-nonpolar transition in that the transition between its polar form and nonpolar form may be rapid, occur at a low temperature, and be complete. The N-cyclicalkyl-cycloalkylamine may also exhibit a low water solubility of the nonpolar form, a low membrane permeability, compatibility with a wide range of membrane materials used in ODMP processes, high osmotic pressure in its polar form, and good osmotically driven membrane process flux kinetics. By exhibiting these properties, the N-cyclicalkyl-cycloalkylamine may be a more effective draw solute compared to other tertiary amines used as draw solutes, such as DMCA. Without being bound by any theory, it is believed that the higher molecular mass and increased organic character of the N-cyclicalkyl-cycloalkylamine provides these improved properties over DMCA.

Surprisingly, the N-cyclicalkyl-cycloalkylamine (e.g., CHP) in its polar form exhibited an effective polar-to-nonpolar transition, a high osmotic pressure, and improved compatibility with conventional membrane materials. The more effective polar-to-nonpolar transition of CHP was unexpected compared to that of DMCA because a more nonpolar tertiary amine compound than DMCA would be predicted to exhibit an osmotic pressure unsuitably low for use in an ODMP process or no favorable osmotic properties. However, it was determined experimentally that high concentration CHP-$H^+$ has an osmotic pressure of greater than about 500 atm comparable to that for DMCA. Thus, the ability to remove the N-cyclicalkyl-cycloalkylamine (e.g., CHP) from water-containing solutions was greatly increased compared to that of DMCA without compromising osmotic pressure.

The following examples serve to explain embodiments of the present disclosure in more detail. These examples are not to be construed as being exhaustive or exclusive as to the scope of this disclosure.

EXAMPLES

House deionized (DI) water was used in all experiments. CHP was obtained from Alfa Aesar and used as received. All equipment was used in accordance with manufacturer specifications unless stated otherwise. Freezing point depression osmometry was performed using an Advanced Instruments, Inc. Model 3250 Osmometer. Viscosity measurements were made using the falling bob method with a Cambridge Applied Systems VL4100 viscometer.

Example 1

Preparation of Draw Solution Including CHP-$H^+$

DI water (229.7 g) and CHP (221.2 g, 1.32 mol) were placed in a bottle equipped with a gas diffuser and exposed to a steady stream of carbon dioxide for 3 hours while being stirred with a magnetic stir bar. The resulting product was a clear homogeneous solution with a mass of 491.4 g, a solution viscosity of 44.0 cP at 15.0° C., and a density of 1.09 g/ml at 21° C. After exposure to the carbon dioxide, the solution contained CHP-$H^+$ (i.e., CHP in its polar form).

Example 2

Osmotic Pressure of CHP

A functional-group contribution model was used to predict the maximum concentration of CHP and CHP's maximum osmotic pressure according to the following equation: SPS ($H_2CO_3$(M))=7.86−0.62($\Sigma$ carbon)−0.55$\beta$−1.1$\gamma$0.5$\delta$+1.2($\alpha$ ring), where $\Sigma$, $\beta$, $\gamma$, $\delta$, and $\alpha$ ring are carbon atoms with a different ability to influence steric crowding at a nitrogen atom as described in Wilson et al., "Structure-Function Study of Tertiary Amines as Switchable Polarity Solvents," RSC Adv., 2014, 4, 11039-11049. The functional-group contribution model predicted a concentration of about 2.34 M by amine (4.27 mol/kg by amine) or about 204 atm based on common osmotic-SPS properties. In comparison, DMCA had a calculated value of 3.56 M by amine according to the above equation.

This was a significant underestimate of the experimentally measured values of a maximum concentration of 3.42 M by amine (11.21 mol/kg by amine) and a projected osmotic pressure of 536 atm. CHP was determined to form an osmotic-SPS, an SPS that supplies osmotic pressure, with an amine:carbonic acid ratio of 1.00 or approximately 1:1. This amine:carbonic acid ratio was the lowest ratio observed thus far for an SPS. In comparison, DMCA had an amine:carbonic acid ratio of greater than 1.08:1. More significantly, CHP was determined to be the first osmotic-SPS tertiary amine to have a carbon count higher than 10 without the inclusion of a glycol functionality.

Figure 3:
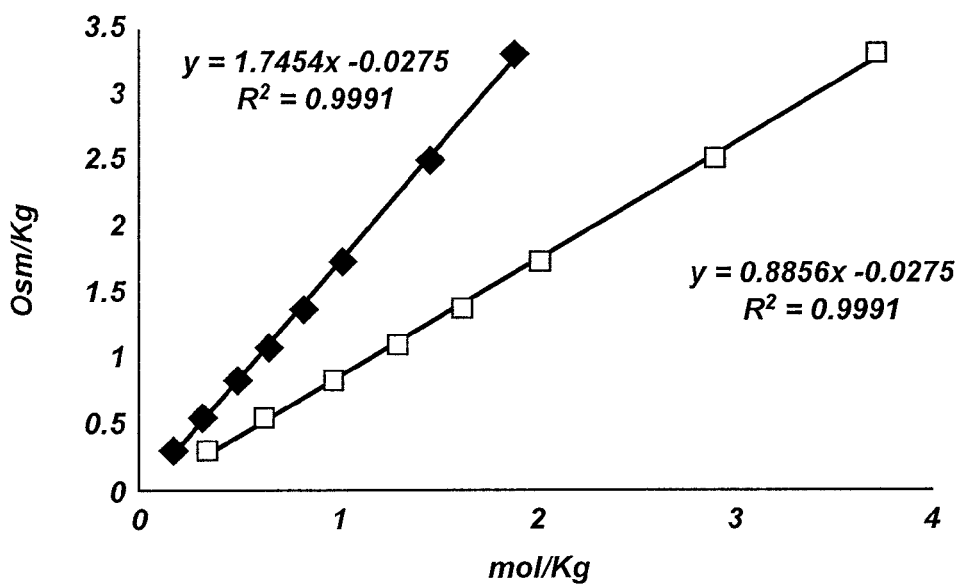
FIG. 3 is a van't Hoff plot for 1-cyclohexylpiperidine (CHP)

A van't Hoff plot for CHP is shown in FIG. 3. Diluting a CHP bicarbonate solution produced a very linear relationship between concentration and freezing point depression, as shown in FIG. 3. The diamond symbols indicate molality of amine and ammonium ions. The square symbols indicate the total species molality including amines, ammonium ions, and carbonate species. Projecting from this dilute solution data suggested that the maximum osmotic pressure for CHP was in excess of 500 atm. While this is less than full concentration dimethylcyclohexylammonium bicarbonate solution (~835 atm), CHP is above the threshold where specific osmotic pressure is a significant factor. There is strong evidence that as osmotic pressures increase, there are diminishing returns in terms of kinetics for osmotic flux. For any osmotic pressure over 370 atm, the osmotic pressure of a saturated NaCl solution is likely to be less important than solute and solution properties like diffusion and viscosity.

Example 3

Osmotic Pressures of Different Tertiary Amines

Figure 4:
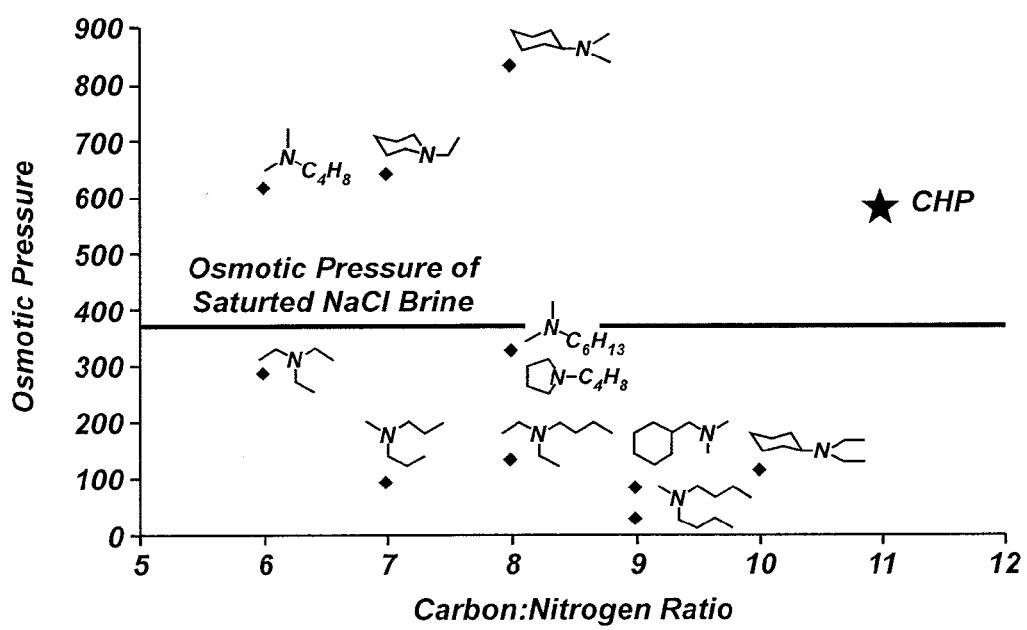
FIG. 4 is a plot of osmotic pressure as a function of carbon:nitrogen ratio for different tertiary amines.

The maximum osmotic pressures of different tertiary amines were determined by osmometry. The chemical structures of the tertiary amines are as indicated in FIG. 4, and CHP is indicated by the star symbol. FIG. 4 shows the osmotic pressure as a function of carbon:nitrogen ratio for each of the tertiary amines. Seven of the tertiary amines had osmotic pressures greater than 250 atm. However, CHP was the only tertiary amine that had a carbon:nitrogen ratio of greater than 10 and an osmotic pressure greater than 250 atm.

Thus, while some of these tertiary amines exhibited an osmotic pressure greater than 250 atm, CHP exhibited a high osmotic pressure while having a carbon:nitrogen ratio of 11.

Figure 5:
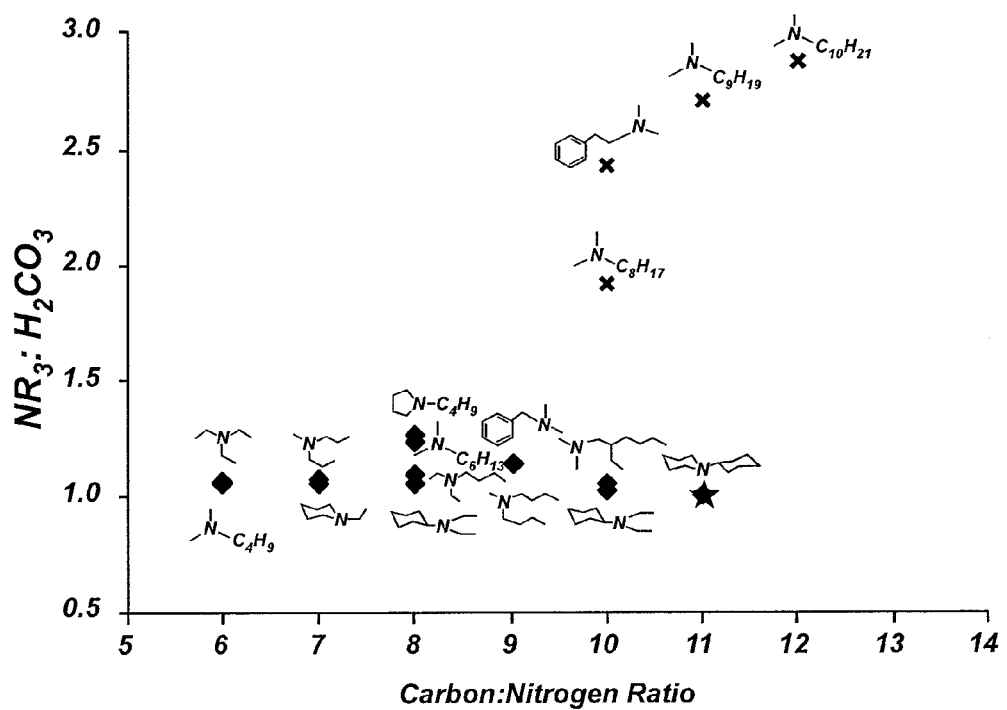
FIGS. 5 and 6 are plots of amine:carbonate ratio as a function of carbon:nitrogen ratio for different tertiary amines.
Figure 6:
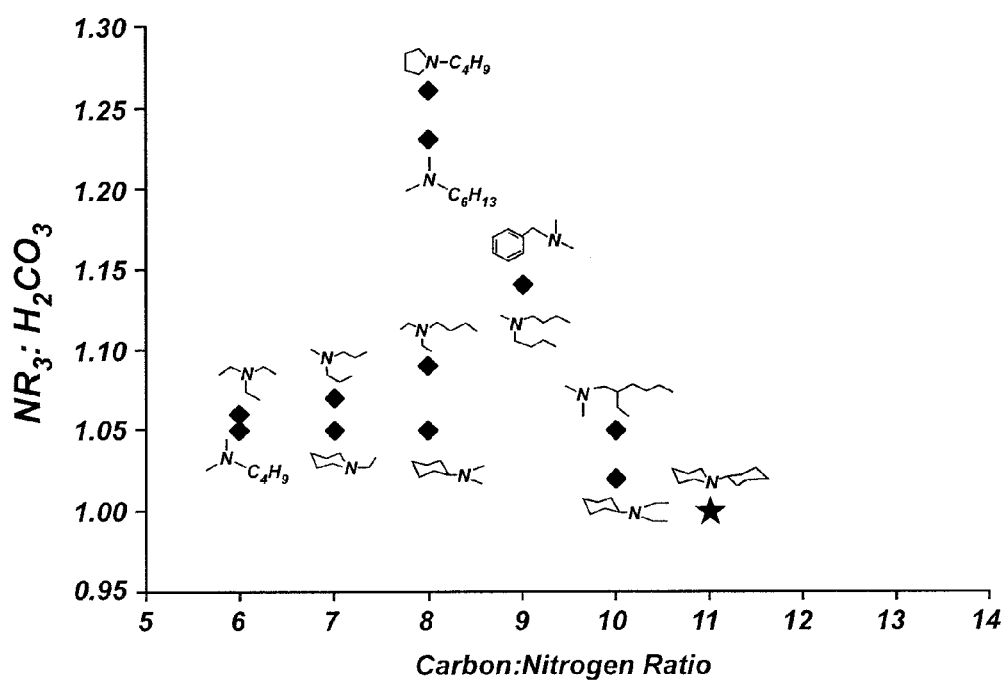

Plots of the amine:carbonate ratio as a function of carbon:nitrogen ratio for each of the tertiary amines are shown in FIGS. 5 and 6, where FIG. 6 shows only the tertiary amines that were determined to be osmotic SPSs. The chemical structures of the tertiary amines are as indicated in FIGS. 5 and 6, and CHP is indicated by the star symbol. The four tertiary amines indicated with the "X" symbol were determined to be non-osmotic SPSs. The determination of CHP as an osmotic SPS was unexpected. A previous model (as described in Durelle et al., "Modelling the Behaviour of Switchable-Hydrophilicity Solvents," Phys. Chem. Chem. Phys: 10.1039.c3cp55391d, Jan. 27, 2014) would predict CHP to be a borderline SPS. The calculated (ChemSpider) $K_{OW}$ of CHP is 3.67. Estimating a $pK_{aH}$ of CHP at between 9 and 10.5, CHP would be predicted to be a borderline SPS assuming a $pK_a$ of 10.5 based on the model of Durelle and anything lower would be nonfunctional.

Example 4

Flux Experiments

All flux experiments were conducted in "FO mode" with the membrane's active layer facing the feed solution. The process was allowed 1-5 minutes to equilibrate and the average of the next 10 minutes was reported as the "initial flux."

Initial flux experiments with an about 30 wt % solution of CHP-H$^+$ (CHP-H$^+$ HCO$_3^-$) against pure water exhibited similar flux behaviors to 0.9 mol/kg NaCl against pure water. Using identical membranes and test conditions, the water flux for CHP-H$^+$ was 10 kg/m$^2$ hr compared with 10 kg/m$^2$ hr for the NaCl solution.

Example 5

Draw Solution Degassing

To determine the relative performance of CHP and DMCA at different temperatures, draw solutions containing CHP or DMCA were recirculated through a segment of a heat exchanger featuring a high surface area honeycomb composition design with a temperature regulated fluid recirculated through the other path. Concentration data was collected with a freezing point osmometer by conventional techniques. Osmolality is an excellent predictor for the pressure needed to remove dissolved solids by filtration. Generally, 1 Osm/Kg corresponds to about 24.5 atm.

Upon addition of one atm of CO$_2$ to the draw solution of Example 1, the oily, nonpolar CHP readily produced the corresponding polar ammonium bicarbonate acid-base salt. To test the degassing process, CHP-ammonium bicarbonate solutions were recirculated through a high surface area heat exchanger with a gear pump while the other loop of the heat exchanger was attached to a recirculating heat bath that was set to the desired temperature. The experiment progression was monitored with a freezing point osmometry. The degassing process was intended to reduce the solution osmotic pressure, reducing it to nothing or minimizing it for a low pressure RO treatment. The progress of the degassing reaction was measured by osmometry, which corresponds to osmotic pressure and can be rapidly obtained. For comparison, a draw solution including DMCA-H$^+$ was also investigated. In the case of DMCA at full concentration, it will start degassing at a temperature as low as 25° C., requiring viscosity measurements to be made at 15° C. However, DMCA requires nearly reflux conditions to fully remove the CO$_2$.

Figure 7:
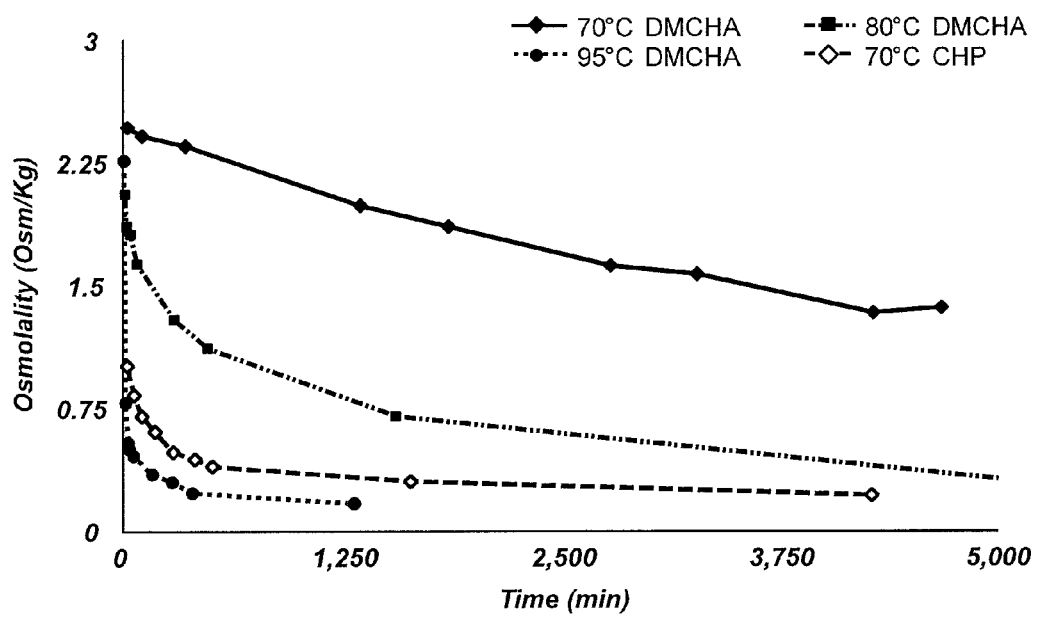
FIG. 7 is a plot of osmolality versus time at different temperatures for CHP and DMCA.

As shown in FIG. 7, when DMCA-H$^+$ was degassed at 70° C., it would reach 2.4 Osm/Kg after 4-6 hours, more than twice the osmotic pressure of sea water. Degassing at 95° C. would reach 0.2 Osm/Kg after 6.5 hours, which was still too high for an SPS FO process while using a high grade heat source. When CHP-H$^+$ was degassed at 70° C., it reached 0.6 Osm/Kg within 3 hours and dropped to 0.2 Osm/Kg after extended treatment. Thus, the CHP-H$^+$ polar-to-nonpolar transition was driven by a circulation through a high surface heat exchanger at 70° C. and demonstrated that the CHP is far more easily degassed than DMCA.

As shown in FIG. 7, the ability to remove or degas CHP from the draw solution was greatly increased compared to that of removing DMCA. A temperature of about 95° C. was needed to degas DMCA at ambient atmospheric pressure. In contrast, a temperature of about 70° C. was needed to degas CHP with comparable kinetics.

The embodiments of the disclosure described above and illustrated in the accompanying drawings do not limit the scope of the invention, since these embodiments are merely examples of embodiments of the disclosure. The invention is defined by the appended claims and their legal equivalents. Any equivalent embodiments lie within the scope of this disclosure. Indeed, various modifications of the present disclosure, in addition to those shown and described herein, such as alternative useful combinations of the elements described, will become apparent to those of ordinary skill in the art from the description. Such modifications and embodiments also fall within the scope of the appended claims and their legal equivalents.

What is claimed is:

1. A method of treating a liquid, the method comprising:
   converting a draw solution comprising at least one N-cyclicalkyl-cycloalkylamine in a nonpolar form into a draw solution comprising the at least one N-cyclicalkyl-cycloalkylamine in a polar form;
   contacting one side of a membrane with the draw solution comprising the at least one N-cyclicalkyl-cycloalkylamine in the polar form and an opposite side of the membrane with a feed liquid comprising at least one solvent and at least one solute; and
   osmosing the at least one solvent of the feed liquid across the membrane and into the draw solution to form a diluted draw solution and a concentrated feed liquid.

2. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises contacting the draw solution comprising the at least one N-cyclicalkyl-cycloalkylamine in the nonpolar form with a switching agent.

3. The method of claim 2, further comprising removing the switching agent from the diluted draw solution to form a multiple-phase solution comprising the at least one N-cyclicalkyl-cycloalkylamine in the nonpolar form and the at least one solvent.

4. The method of claim 3, further comprising separating the at least one N-cyclicalkyl-cycloalkylamine in the nonpolar form and the at least one solvent.

5. The method of claim 4, further comprising recovering the at least one N-cyclicalkyl-cycloalkylamine in the nonpolar form.

6. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises converting the at least one N-cyclicalkyl-cycloalkylamine in the nonpolar form to an aminium salt of the at least one N-cyclicalkyl-cycloalkylamine.

7. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises converting the at least one N-cyclicalkyl-cycloalkylamine in the nonpolar form to an aminium carbonate of the at least one N-cyclicalkyl-cycloalkylamine.

8. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises exposing the draw solution comprising the at least one N-cyclicalkyl-cycloalkylamine in the nonpolar form to carbon dioxide.

9. The method of claim 1, wherein osmosing the at least one solvent of the feed liquid across the membrane and into the draw solution to form a diluted draw solution and a concentrated feed liquid comprises osmosing the at least one solvent of the feed liquid across the membrane and into the draw solution to form a diluted draw solution on the one side of the membrane and a concentrated feed liquid on the opposite side of the membrane.

10. The method of claim 1, wherein osmosing the at least one solvent of the feed liquid across the membrane and into the draw solution to form a diluted draw solution and a concentrated feed liquid comprises forming the concentrated feed liquid comprising the at least one solute and the diluted draw solution comprising the at least one N-cyclicalkyl-cycloalkylamine in the polar form.

11. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises converting a draw solution comprising at least one N-cyclicalkyl-cycloalkylamine comprising the chemical structure:

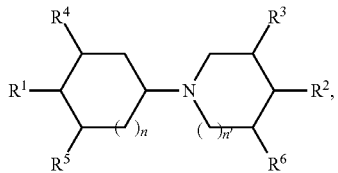

wherein n is 0, 1, or 2, n' is 0, 1, or 2, and each of $R^1$-$R^6$ is independently selected from the group consisting of an alkyl group, an alkoxy group, an acetyl group, an aryl group, a hydrogen group, a hydroxyl group, and a phosphorus-containing group.

12. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises converting the draw solution comprising the at least one N-cyclicalkyl-cycloalkylamine into a draw solution comprising a bicarbonate form of the at least one N-cyclicalkyl-cycloalkylamine.

13. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises converting the draw solution comprising the at least one N-cyclicalkyl-cycloalkylamine into a draw solution comprising the chemical structure:

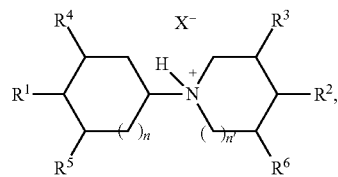

wherein n is 0, 1, or 2, n' is 0, 1, or 2, each of $R^1$-$R^6$ is independently selected from the group consisting of an alkyl group, an alkoxy group, an acetyl group, an aryl group, a hydrogen group, a hydroxyl group, and a phosphorus-containing group, and X is an anionic counterion.

14. The method of claim 1, wherein converting a draw solution comprising at least one N-cyclicalkyl-cycloalkylamine in a nonpolar form into a draw solution comprising the at least one N-cyclicalkyl-cycloalkylamine in a polar form comprises converting a draw solution comprising 1-cyclohexylpiperidine into a draw solution comprising a bicarbonate form of 1-cyclohexylpiperidine.

15. A method of treating a liquid, the method comprising:
converting a draw solution comprising at least one N-cyclicalkyl-cycloalkylamine having the chemical structure:

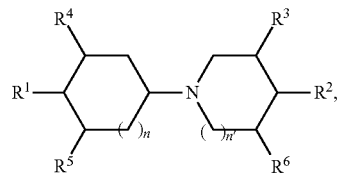

wherein n is 0, 1, or 2, n' is 0, 1, or 2, and each of $R^1$-$R^6$ is independently selected from the group consisting of an alkyl group, an alkoxy group, an acetyl group, an aryl group, a hydrogen group, a hydroxyl group, and a phosphorus-containing group, into a draw solution comprising the at least one N-cyclicalkyl-cycloalkylamine in a polar form;
contacting one side of a membrane with the draw solution comprising the at least one N-cyclicalkyl-cycloalkylamine in the polar form and an opposite side of the membrane with a feed liquid comprising at least one solvent and at least one solute; and
osmosing the at least one solvent of the feed liquid across the membrane and into the draw solution to form a diluted draw solution and a concentrated feed liquid.

16. The method of claim 15, wherein converting a draw solution comprising at least one N-cyclicalkyl-cycloalkylamine comprises converting the draw solution comprising the at least one N-cyclicalkyl-cycloalkylamine where is 1 and n' is 1.

17. The method of claim 15, wherein converting a draw solution comprising at least one N-cyclicalkyl-cycloalkylamine comprises converting the draw solution comprising the at least one N-cyclicalkyl-cycloalkylamine wherein each of $R^1$ and $R^2$ is independently selected from the group consisting of an alkyl group, an alkoxy group, an acetyl group, an aryl group, a hydroxyl group, and a phosphorus-containing group and each of $R^3$-$R^6$ is a hydrogen group.

18. The method of claim 15, wherein converting a draw solution comprising at least one N-cyclicalkyl-cycloalkylamine comprises converting the draw solution comprising the at least one N-cyclicalkyl-cycloalkylamine in a secondary solvent.

19. The method of claim 15, wherein converting a draw solution comprising at least one N-cyclicalkyl-cycloalkylamine comprises converting the draw solution comprising the at least one N-cyclicalkyl-cycloalkylamine into the polar form, the polar form of the at least one N-cyclicalkyl-cycloalkylamine being miscible with the secondary solvent.

* * * * *